(12) United States Patent
Chokkalingam et al.

(10) Patent No.: US 9,489,241 B2
(45) Date of Patent: Nov. 8, 2016

(54) GUARANTEED RESPONSE PATTERN

(75) Inventors: Sendhil M. Chokkalingam, Redmond, WA (US); Jayesh A. Netravali, Pune (IN); Srinidhi K. Venkateshprasad, Bangalore (IN)

(73) Assignee: III Holdings 1, LLC, Wilmington, DE (US)

( * ) Notice: Subject to any disclaimer, the term of this patent is extended or adjusted under 35 U.S.C. 154(b) by 322 days.

(21) Appl. No.: 13/099,165

(22) Filed: May 2, 2011

(65) Prior Publication Data

US 2012/0284390 A1    Nov. 8, 2012

(51) Int. Cl.
*G06F 15/173* (2006.01)
*G06F 9/50* (2006.01)
*H04L 29/08* (2006.01)

(52) U.S. Cl.
CPC ....... *G06F 9/5027* (2013.01); *G06F 2209/503* (2013.01); *H04L 67/02* (2013.01)

(58) Field of Classification Search
CPC .. H04L 67/02; H04L 67/1008; H04L 67/327
USPC ........................................ 709/224, 202, 242
See application file for complete search history.

(56) References Cited

U.S. PATENT DOCUMENTS

| | | | |
|---|---|---|---|
| 8,260,917 B1* | 9/2012 | Manikowski et al. | 709/225 |
| 8,463,909 B1* | 6/2013 | Szabo et al. | H04L 67/2819 370/412 |
| 2005/0273456 A1* | 12/2005 | Revanuru et al. | 707/1 |
| 2008/0244623 A1* | 10/2008 | Graser et al. | 719/328 |
| 2010/0083281 A1* | 4/2010 | Malladi et al. | 719/317 |
| 2010/0333111 A1* | 12/2010 | Kothamasu et al. | 719/313 |
| 2011/0047292 A1* | 2/2011 | Gould et al. | 709/242 |
| 2012/0047517 A1* | 2/2012 | Townsend et al. | H04M 3/5191 719/313 |
| 2012/0197959 A1* | 8/2012 | Oliver et al. | 709/201 |
| 2012/0265744 A1* | 10/2012 | Berkowitz et al. | G06F 17/30873 707/705 |

* cited by examiner

*Primary Examiner* — Hitesh Patel
(74) *Attorney, Agent, or Firm* — Meyertons, Hood, Kivlin, Kowert & Goetzel, P.C.

(57) ABSTRACT

Methods, systems and computer readable medium are presented for providing a response to a request. A request (e.g., a java request) is received by a computer-based system for providing a response to a request. The availability of the backend system (e.g., java dispatching system) request is analyzed in response to receiving the request. In response to a determination that the backend system is unavailable to process the request, an unavailable response is transmitted. In response to a determination that the backend system is available to process the request, the request is transmitted to a backend system to process the request.

11 Claims, 8 Drawing Sheets

GUARANTEED RESPONSE PATTERN

FIELD

The present disclosure generally relates to online systems. More particularly, the disclosure relates to methods, systems, and computer readable mediums for providing a response to a request.

BACKGROUND

Online systems may provide numerous products and services to a requestor. Some examples of such products and services include general browsing of websites, online purchase and sale of products, financial services including facilitating financial transactions, and downloading information. The requestor may utilize these products and services by sending requests to the online systems.

Typically, the requestor sends a request to the online system using a web application. The online system often includes a middleware application for processing the requests. The middleware application forwards the received request to the backend system. In response to receiving the request, the backend system processes it and sends an appropriate response to the middleware application. The middleware application may send the response to the requestor.

However, such architecture for handling requests may not be effective when the backend system is heavily loaded, slowing down, and/or not working properly. In such cases, the requestor may experience exceptionally long wait times or no response at all due to a "time out" which may be frustrating for the requestor. As a result, while waiting for the response, the requestor may send the same request repeatedly, thereby resulting in a long queue of similar requests. This may lead to overloading at the backend system, thus exacerbating the existing situation further and resulting in slow recovery of the backend system.

Given the foregoing, what is needed is a system, a method and a computer readable medium for providing timely responses to requests.

SUMMARY

The present disclosure meets the above-identified need by providing methods, systems and non-transitory computer-readable medium configured to provide a response to a request. In an exemplary embodiment, a request, such as a java request is received by a computer-based system configured to provide a response to a request. The availability of the backend system (e.g., a java dispatching system) is analyzed in response to receiving the request. In response to a determination that the backend system is unavailable to process the request an unavailable response is transmitted. In response to a determination that the backend system is available to process the request, the request is transmitted to a backend system to process the request.

In various embodiments, the unavailable response includes a notice directing the requestor to try again, a notice indicating that the system is buffering, a notice directing the requestor to try an additional communication channel, a notice indicating there is an error, and/or a notice directing the requestor to try again at a later time. Backend system availability may be improved by not transmitting a request to the backend system in response to detecting periods of unavailability.

In some embodiments, analyzing the availability of the backend system includes detecting unavailability and/or detecting a decrease in backend system response. The method may include storing the request in a request queue in response to detecting a decrease in backend system response. The method may include transmitting an unavailable response to the request in response to the determination that the request queue is unavailable to store the request. The method may include buffering the request in response to the determination that the status of the request queue will change from unavailable to available within a predetermined threshold.

In some embodiments, analyzing the availability of the backend system includes analyzing backend resource pooling for optimal resource allocation. The computer based system may dynamically substantially in run-time reallocate optimal resource pooling in response to backend resource pooling analysis. Availability may be predicted based on historical availability.

In various embodiments, the method may include buffering the request in response to a determination that the status of the backend system will change from unavailable to available within a predetermined threshold and/or buffering the request, by the computer based system, for a predetermined threshold. In some embodiments, in response to transmitting an unavailable response, the system does not transmit the request to the backend system. The request may be a request associated with transaction accounts and/or financial services. The method may include tracking the volume of unavailable responses transmitted, the reason for backend system unavailability associated with an unavailable response transmission, information associated with the request to which the unavailable response is transmitted, time to return the unavailable response and/or the resources available in a resource pool when the unavailable response is transmitted. The method may further include reallocating resources in the resource pool in response to the tracking.

Further features and advantages of the present disclosure as well as the structure and operation of various embodiments are described in detail below with reference to the accompanying drawings.

BRIEF DESCRIPTION OF THE DRAWINGS

The features and advantages of the present disclosure will become more apparent from the detailed description set forth below when taken in conjunction with the drawings, in which like reference numbers indicate identical or functionally similar elements. Additionally, the left-most digit of a reference number identifies the drawing in which the reference number first appears.

DETAILED DESCRIPTION

Figure 1:
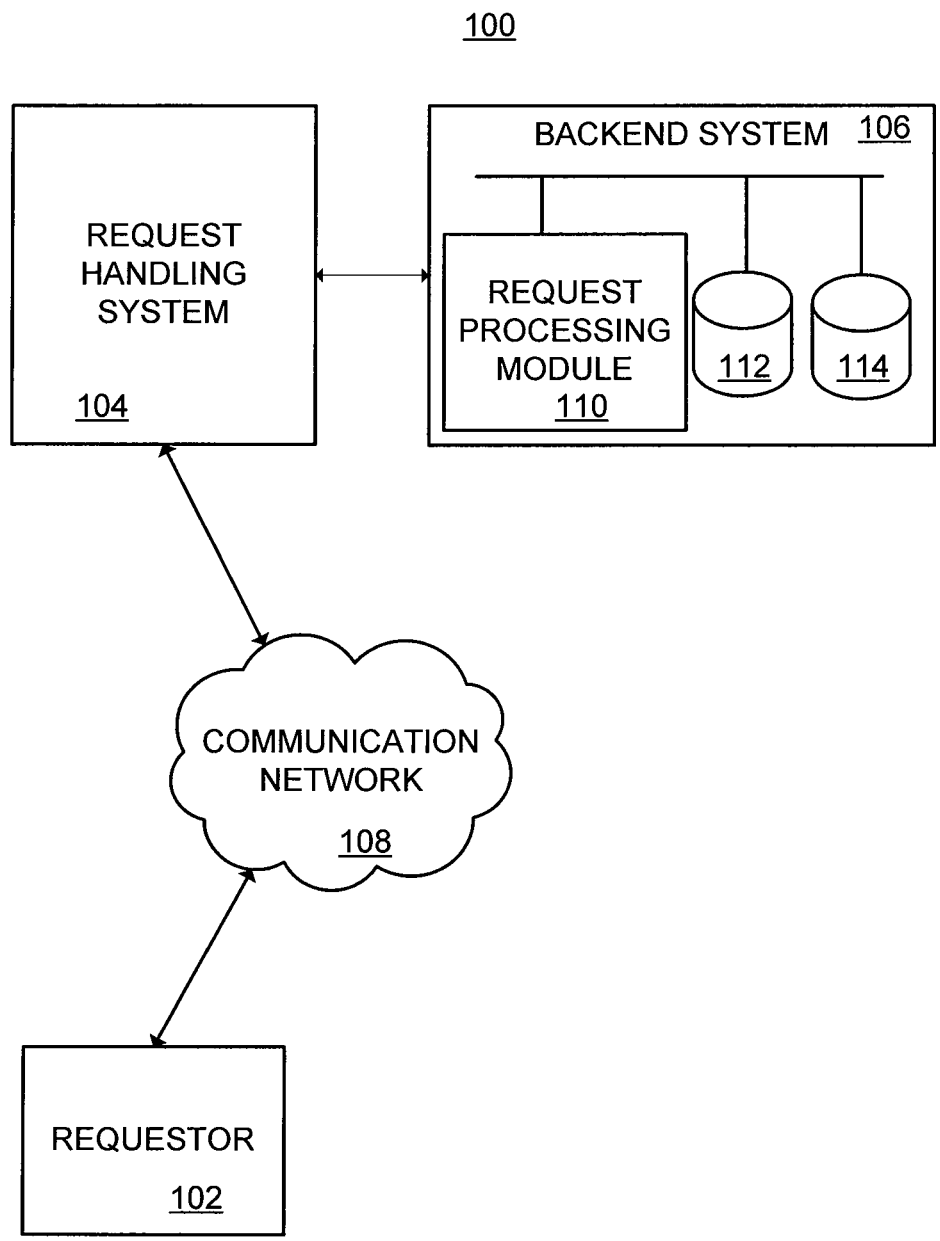
FIG. 1 is an exemplary environment in which a system for providing a response to a request may be deployed, according to an exemplary embodiment.

The detailed description of exemplary embodiments of the disclosure herein makes reference to the accompanying drawings and figures, which show the exemplary embodiments by way of illustration only. While these exemplary embodiments are described in sufficient detail to enable those skilled in the art to practice the disclosure, it should be understood that other embodiments may be realized and that logical and mechanical changes may be made without departing from the spirit and scope of the disclosure. It will be apparent to a person skilled in the pertinent art that this system and/or method can also be employed in a variety of other applications. Thus, the detailed description herein is presented for purposes of illustration only and not of limitation. For example, the steps recited in any of the method or process descriptions may be executed in any order and are not limited to the order presented.

For the sake of brevity, conventional data networking, application development and other functional aspects of the systems (and components of the consumer operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The present disclosure references various system architecture, block diagrams and flowchart illustrations of methods, and computer program products according to various embodiments of the disclosure. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, websites, web forms, prompts, etc. Practitioners will appreciate that the illustrated steps described herein may comprise in any number of configurations including the use of windows, web pages, hypertexts, hyperlinks, web forms, popup windows, prompts and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

The terms "service provider" or "merchant" may be used interchangeably with each other and shall mean any on-line distributor system, software and/or hardware that is a provider of products and/or services. For example, a merchant may be an on-line merchant, an on-line content provider or the like. The service provider may be a small, medium or large sized business entity. The service provider may use this disclosure to provide services to the customers.

A "requestor", as used herein, may include any individual, business, entity, group, charity, software and/or hardware that make a request to the service provider. It is noted that the terms "customer," "requestor," "consumer," "transaction account holders", "user" and "population" are used interchangeably herein.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to affect such feature, structure, or characteristic in connection with other embodiments whether or not explicitly described.

The systems, methods and computer program products disclosed in conjunction with various embodiments of the present disclosure are embodied in systems and methods for providing a response to a request. The nomenclature "request handling system" is only exemplary and used for descriptive purposes, and must not be construed to limit the scope of the present disclosure.

The present disclosure is now described in more detail herein in terms of the above disclosed exemplary embodiments of system, processes and computer program products. This is for convenience only and is not intended to limit the application of the present disclosure. In fact, after reading the following description, it will be apparent to one skilled in the relevant art(s) how to implement the following disclosure in alternative embodiments.

FIG. 1 shows an exemplary environment 100 in which the systems and/or methods may be utilized, in accordance with an embodiment. Environment 100 includes at least one requestor, such as a requestor 102, a request handling system 104, a backend system 106, and a communication network 108. Requestor 102 and request handling system 104 communicate with each other over communication network 108. Examples of communication network 108 may include a wide area network (WAN), a local area network (LAN), an Ethernet, Internet, an Intranet, a cellular network, a satellite network, or any other suitable network for transmitting data. Communication network 108 may be implemented as a wired network, a wireless network or a combination thereof.

Requestor 102 may include any hardware and/or software suitably configured to make a request to backend system 106 and/or review of information relating to making a request or any information discussed herein. As those skilled in the art will appreciate, requestor 102 may include an operating system (e.g., Windows NT®, 95/98/2000, OS2, UNIX®, Linux®, Solaris®, MacOS®, etc.) as well as various conventional support software and drivers typically associated with computers. Further, requestor 102 may include any suitable personal computer, network computer, workstation, minicomputer, mainframe or the like. Furthermore, requestor 102 may be in a home or business environment with access to a network. In an exemplary embodiment, access is through a network or the Internet through a commercially available web-browser software package.

In an exemplary implementation as shown in FIG. 1, requestor 102 may be communicatively coupled with request handling system 104 through communication network 108. Also, backend system 106 may be communicably coupled with request handling system 104 via communication network 108. Requestor 102 may make a request for utilizing products/services offered by service provider, performing a financial transaction, request a webpage, download content and the like. In an embodiment, a request made by requestor 102 may be a java based request. Request handling system 104 may analyze availability of backend system 106 In response to receiving the request from requestor 102. Upon determination that backend system 106 is available, the request may be forwarded to backend system 106 for processing. During this processing, a response may be transmitted by backend system 106 to request handling system 104 which forwards it to requestor 102. In an embodiment, request handling system 104 may be configured to directly provide a response to a request made by requestor 102. Specifically, request handling system 104 may determine that backend system 106 is unavailable and hence, may transmit an unavailable response to requestor 102.

In an embodiment, request handling system 104 may be deployed as a separate entity on a third party server. In another embodiment, request handling system 104 may be deployed on one or more servers associated with a service provider deploying backend system 106. Although, request handling system 104 is described herein in terms of providing a response to a java-based request, it will be readily apparent to one skilled in the art that a similar request handling system may be deployed for other types of requests such as, but without limitation, requests for financial services, transaction accounts, requests related to general content browsing (web page requests), on-line content providing services, network related requests and the like.

In an exemplary implementation as shown in FIG. 1, backend system 106 may include a request processing module 110, a customer database 112 and one or more local databases 114. Backend system 106 may include computing units or devices (e.g., personal computer). These computing units or systems may take the form of a computer or set of computers, although other types of computing units or systems may be used, including laptops, notebooks, hand held computers, workstations, computer-servers, main frame computers (e.g., IBM Sysplex), mini-computers, PC servers, pervasive computers, network sets of computers, and/or the like. Further, computing units or systems may be partitioned into multiple logical partitions (e.g., LPAR on IBM mainframes), each hosting a separate operating system. In an embodiment, backend system 106 is a java dispatcher backend system. Practitioners will appreciate that backend system 106 may or may not be in direct contact with request handling system 104. For example, request handling system 104 may access the services offered by backend system 106 of the service provider through another server, which may have a direct or indirect connection with communication network 108.

Request processing module 110 of backend system 106 receives the request forwarded by request handling system 104. Request processing module 110 processes the received request and generates an appropriate response corresponding to the request made by requestor 102. The generated response is transmitted to request handling system 104 which forwards it to requestor 102. As those skilled in the art will appreciate, request processing module 110 may include an operating system (e.g., Windows NT®, 95/98/2000, OS2, UNIX®, Linux®, Solaris®, MacOs, etc.) as well as various conventional support software and drivers typically associated with computers. Further, request processing module 110 may include any suitable personal computer, network computer, workstation, minicomputer, mainframe or the like.

In various embodiments, products/services offered by the backend system 106 of the service provider include financial services, transaction accounts, on-line content providing services and the like. Requestors 102 or transaction account holders may use their transaction account to communicate electronically with the service provider (e.g., from a user computer via the Internet). During the interaction, the service provider may offer goods and/or services to the requestor 102. The service provider may also offer the users the option of paying for the goods and/or services using any number of available transaction accounts. Furthermore, the transaction accounts may be used by the service provider as a form of identification of the customers. The service provider may have a computing unit implemented in the form of a computer-server, although other implementations are possible. In general, transaction accounts may be used for transactions between the requestor 102 and service provider through any suitable communication means, such as, for example, a telephone network, intranet, public Internet, a point of interaction device (e.g., a point of sale (POS) device, personal digital assistant (PDA), mobile telephone, kiosk, etc.), online communications, off-line communications, wireless communications, and/or the like.

Customer database 112 may store data of all customers utilizing products/services offered by the service provider. The customer data may include, but is not limited to, a name, an address, current geographical location, gender, age, martial status information, education information, income information and other demographic information, contact details, such as e-mail address, phone number, correspondence address, social security number, and the like, transaction history, financial details, payment information and the like. Customer database 112 may store other characteristic data of the customers, apart from the transaction history. It may be evident to those skilled in the art that customer database 112 may include a plurality of databases, storing a particular characteristic data or a group of characteristic data associated with the customers. For example, customer database 112 may store back account related data such as account transactions, opening balance, closing balance, average balance over a period of time, interest earned over a period of time, etc. Further, customer database 112 may store tenure information, domicile information, family related information, debt information, social networking data, survey data, purchasing power information, size of wallet information, travel related information, religious affiliation information, hobby information, employer information, employment information, vocational information, sexual orientation information, ethnicity information, disability status information, political affiliation information, government data, merchant rewards system data, third-party data, credit bureau data, census bureau data, affinity group information.

Customer database 112 may also store customer's behavior related data. The customer's behavior information includes web browsing patterns, online purchase history, Internet Protocol (IP) address, unique cookie identification data, etc. In various embodiments, the customer's personal information may be entered by the customer while creating a profile on a service provider's website. Further, the customers may also provide their preference setting, related to the offers that they might receive from the service provider, on service provider's website. In one implementation, customer database 112 obtains the customers' behavior related data through third party sources. In an embodiment, third party sources may include various online service providers, for example, Google Analytics, Urchin Software from Google Inc., Yahoo Web Analytics, Omniture's Site Catalyst and the like.

Local databases 114 may store data related to requests sent by the customers to the service provider. Request related data may include number of requests sent by each customer, type of requests, responses to the requests, timestamps of the requests and corresponding responses etc. Local databases 114 may also include a database of a bank, a database of a merchant, a database of an airline, a database of a chain of retail stores and the like. For example, local databases 108 may extract data relating to volume of requests received, frequency of requests received, volume of requests processed, ordering of request queues, resource allocation for processing requests and tracking responses transmitted to the customer. Local databases 114 may store data related to products/services offered by the service provider. The data related to the products/services may include features of products/services, manuals/brochures for products/services, pricing information, and/or inventory details.

In an embodiment, local databases 114 of backend system 106 may store the historical availability data of backend system 106. The historical availability data may include average time for processing a request, a reason for unavailability corresponding to each unavailable response, total unavailable responses transmitted, average duration of unavailability and the like. It should be apparent to a person of ordinary skill in the art that the above mentioned historical availability data is offered for the exemplary purposes and does not limit the scope of the disclosure.

Further, local databases 114 may store request history specific to each customer. The request history may include request type, request date, request time, resources for processing the request, and/or frequency of requests made by customers. Local databases 114 may have tagged or made clusters of the customers based on the request history of the customers. For example, if the service provider is a bank, customers who make requests mainly for checking account balance may be clubbed in one group and customers who make requests mainly for money transfer are clubbed in other group and the like.

Customer database 112 and local databases 114 may employ any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. Any suitable data storage technique may be utilized to store data without a standard format. Data sets may be stored using any suitable technique, including, for example, storing individual files using an ISO/DEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using one of fixed storage allocation, circular queue techniques, or best practices with respect to memory management (e.g., paged memory, least recently used, etc.). By using BLOB methods, the ability to store various data sets that have different formats facilitates the storage of data associated with the system by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of customer database 112 and local databases 114, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the request, service provider, issuer (operator of request handling system 104), customers or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate. The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand-alone device, the appropriate option for the action to be taken. Customer database 112 and local databases 114, contemplate a data storage arrangement wherein the header or trailer, or header or trailer history, of the data is stored on the transaction instrument in relation to the appropriate data. One skilled in the art will also appreciate that, for security reasons, any databases, systems, devices, servers or other components of customer database 112, and local databases 114, may consist of any combination thereof at a single location or at multiple locations, wherein each database or system includes any of various suitable security features, such as firewalls, access codes, encryption, decryption, compression, decompression, and/or the like.

The disclosure may be described herein in terms of functional block components, screen shots, optional selections and various processing steps. It should be appreciated that such functional blocks may be realized by any number of hardware and/or software components configured to perform the specified functions. For example, system 100 may employ various integrated circuit components, e.g., memory elements, processing elements, logic elements, look-up tables, and/or the like, which may carry out a variety of functions under the control of one or more microprocessors or other control devices. Similarly, the software elements of system 100 may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that system 100 may employ any number of conventional techniques for data transmission, signaling, data processing, network control, and/or the like. Still further, system 100 could be used to detect or prevent security issues with a client-side scripting language, such as JavaScript, VBScript or the like.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Figure 2:
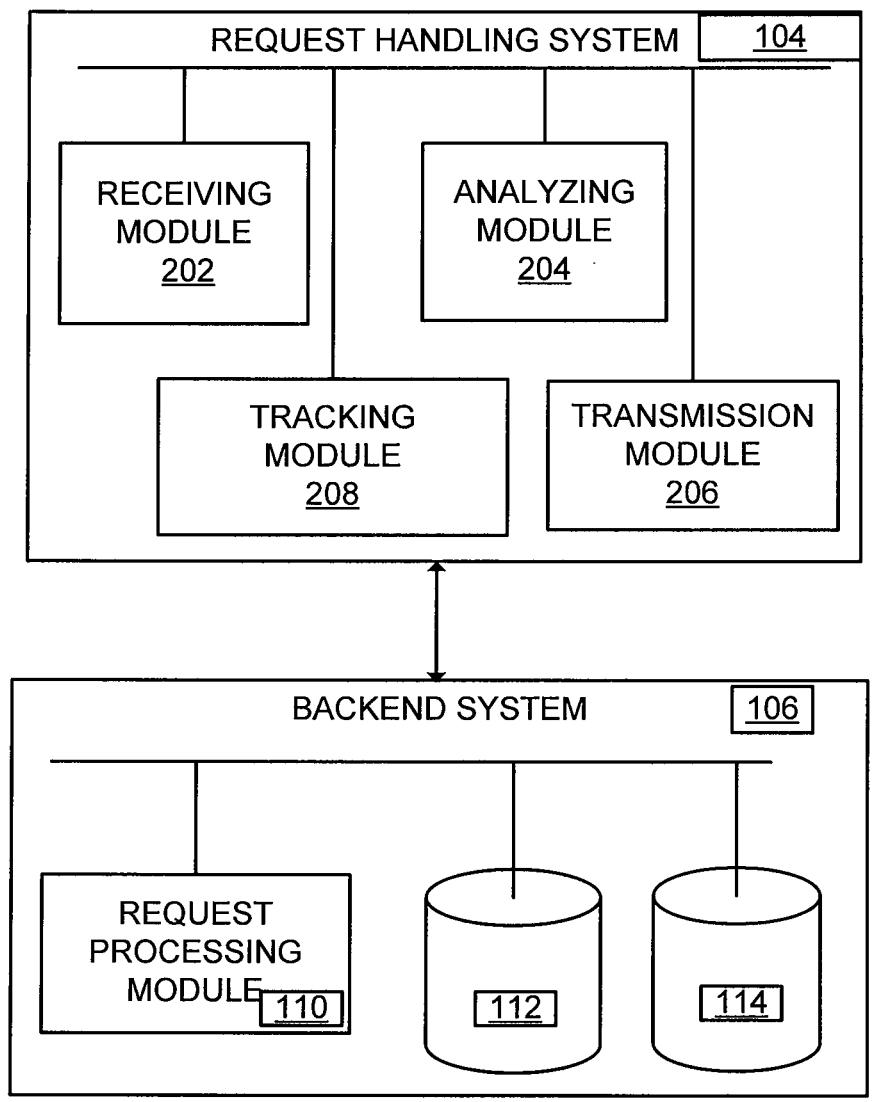
FIG. 2 is an exemplary implementation of the system for providing the response to a requestor, according to an exemplary embodiment.

Referring to FIG. 2, an exemplary implementation of request handling system 104 is depicted, according to an embodiment. As shown in FIG. 2, in an exemplary embodiment request handling system 104 may include a receiving module 202, an analyzing module 204, a transmission module 206, and a tracking module 208.

In an embodiment, receiving module 202 receives a request from requestor 102. In an embodiment, the request may be a java based request. In response to receiving the request, analyzing module 204 may analyze availability of backend system 106. In an exemplary embodiment, analyzing module 204 may track response of backend system 106 and determine availability/unavailability of backend system 106. In one embodiment, analyzing module 204 may detect unavailability of response from backend system 106 within a pre-determined duration. Based on this, analyzing module 204 may determine that backend system 106 is unavailable to process the request. Thereafter, analyzing module 204 may send the result of determination to transmission module 206. Transmission module 206 may transmit the unavailable response to requestor 102. The unavailable response may include a notice indicating there is an error, a notice indicating that the system is buffering, a notice directing requestor 102 to try an alternate communication channel (for example, phone network), a notice directing requestor 102 to try again at a later time, and the like. Further, in response to detecting unavailability, the request may not be transmitted to backend system 106 to improve availability of backend system 106.

In one embodiment, analyzing module 204 may monitor the request for breach of a service level agreement (SLA). Service level agreement may be defined as a part of a service contract between requestor 102 and the service provider where the level of service is formally defined. SLA generally refers to the contracted delivery time (of the service) or performance. For example, internet service providers commonly include service level agreements within the terms of their contracts with customers to define the level(s) of service being sold. In this case the SLA typically have a technical definition in terms of Mean Time Between Failures (MTBF), Mean Time to Repair or Mean time to recovery (MTTR); various data rates; throughput; jitter; or similar measurable details. As a result of monitoring, analyzing module 204 may determine that time to respond as mentioned in the SLA is about to expire. In an embodiment, analyzing module 204 may send a timeout response to transmission module 206 in response to determination that time to respond is about to expire. Transmission module 206 may forward the timeout response to requestor 102.

In another embodiment, analyzing module 204 may detect a decrease in responses from backend system 106. As a result, analyzing module 204 may determine that backend system 106 is unavailable to process the request. In response to detecting the decrease in response from backend system 106, the request may be stored in a request queue. The request queue may be implemented in local databases 114 of backend system 106, a database of request handling system 104, and/or a database hosted at a remote server. Further, analyzing module 204 may track status of the request queue. In an embodiment, analyzing module 204 may determine that the request queue is unavailable to store the request. In one embodiment, the request queue may be full and hence, unavailable to store the request. In another embodiment, a connection between the request queue and analyzing module 204 may break resulting in unavailability of the request queue to store the request. It should be apparent to a person of ordinary skill in the art that above mentioned scenarios are just for the exemplary purposes and does not limit the scope of the disclosure.

In response to unavailability of the request queue, transmission module 206 may transmit the unavailable response to requestor 102. The unavailable response may include a notice indicating there is an error, a notice directing the requestor 102 to try an alternate communication channel (for example, phone network), a notice directing the requestor 102 to try again at a later time, and the like. In an embodiment, the request may not be transmitted to backend system 106 in response to detecting unavailability of backend system 106. In such cases, analyzing module 204 may directly send an overflow response in response to receiving the request. As a result, overburdening of the backend system 106 may be avoided and availability may be improved. Transmission module 206 may receive the overflow response from analyzing module 204 and may forward it to requestor 102. In an embodiment, analyzing module 204 may determine that status of the request queue will change from unavailable to available within a predetermined threshold. Based on this, analyzing module 204 may buffer the request for the predetermined threshold and may wait for the status of the request queue to change to available. An unavailable response including a notice indicating that backend system 106 is buffering may be transmitted to requestor 102.

In an embodiment, analyzing module 204 may determine availability/unavailability of backend system 106 based on resource allocation at backend system 106. In an exemplary embodiment, backend system 106 may implement resource pools for managing and tracking status of resources. Resource pools may be created based on various factors such as demographics, geographies, market segment, and the like. For example, resource pools may be created for each continent. In one embodiment, resource pools consist of three double ended queues (deques) called "RESERVED", "AVAILABLE", and "UNAVAILABLE". The deques may be implemented using proprietary doubly-linked lists. The three deques may respectively contain instances of resources that are currently reserved by, available or unavailable to be reserved by callers, such as application programs. RESERVED contains resource instances that have been requested or are in use. AVAILABLE contains resource instances currently available in the resource pool. UNAVAILABLE will contain resource instances that were previously not created successfully or able to be refreshed, typically because backend system 106 (e.g., local databases 114) is unavailable.

Further, analyzing module 204 may analyze the resource pools at backend system 106 for optimally allocating resources of backend system 106. In an embodiment, resource pools may be tracked by analyzing module 204 to identify oversized resource pools and/or undersized resource pools. In one embodiment, resource pools may be dynamically reallocated for optimal resource allocation. More specifically, resource pools may be resized dynamically based on the result of tracking of resource pools by analyzing module 204. In an embodiment, size of resource pools may change based on the demand of the resources. For example, a resource pool may be of minimum size when created but as demand increases, size of the resource pool may change from minimum pool size to intermediate size. Further, upon increase in demand, the resource pool may be resized to maximum pool size.

In an embodiment, analyzing module 204 may predict availability of backend system 106 based on historical availability data. The historical availability data may be received from local databases 114 of backend system 106. The historical availability data may include average time for processing a request, a reason for unavailability corresponding to each unavailable response, total unavailable responses transmitted, average duration of unavailability and the like. In an embodiment, analyzing module 204 may predict availability of backend system 106 based on historical availability data corresponding to requests made by the requestor 102 in the past. In another embodiment, analyzing module 204 may also analyze the historical availability data of the requestors that made similar requests. It should be apparent to a person of ordinary skill in the art that the above example is offered for exemplary purposes and does not limit the scope of the disclosure in which historical availability data may be stored and utilized for predicting availability of the backend system 106.

In an embodiment, analyzing module 204 may obtain the historical availability data of the backend system 106 from local databases 114. Local databases 114 may store request history specific to each customer. The request history may include, for example, request type, request date, request time, resources for processing the request, frequency of requests made by customers and the like. Local databases 114 may have tagged or made clusters of the customers based on the request history of the customers. For example, if the service provider is a bank, customers who make requests mainly for checking account balance may be clubbed in one group and customers who make requests mainly for money transfer are clubbed in other group and the like.

Analyzing module 204 may also track status of the backend system 106. In an embodiment, analyzing module 204 may determine that status of backend system 106 will change from unavailable to available within a predetermined threshold. Based on this, analyzing module 204 may buffer the request for the predetermined threshold and may wait till the status of backend system 106 changes again to available. An unavailable response including a notice indicating that backend system 106 is buffering may be transmitted to requestor 102.

In an embodiment, tracking module 208 of request handling system 104 may track various information related to availability/unavailability of the backend system 106. Some examples of such information include volume of unavailable responses transmitted, reason for backend system unavailability associated with the transmission of an unavailable response, information associated with the request to which the unavailable response is transmitted, a time to return the unavailable response, and resources available in a resource pool contemporaneous with the unavailable response being transmitted. In one embodiment, tracking module 208 may utilize customer database 112 and local databases 114 for tracking information related to availability/unavailability of the backend system 106. Tracking module 208 may provide the tracked information to analyzing module 204 for analysis of availability/unavailability of backend system 106. In an embodiment, analyzing module 204 may reallocate the resources in the resource pools based on the tracked information. In an embodiment, tracking module 208 may track the information related to availability/unavailability after a predetermined time. The predetermined time may be a portion of a second, a millisecond, second, minute, day, a week, a month or the like.

Figure 3:
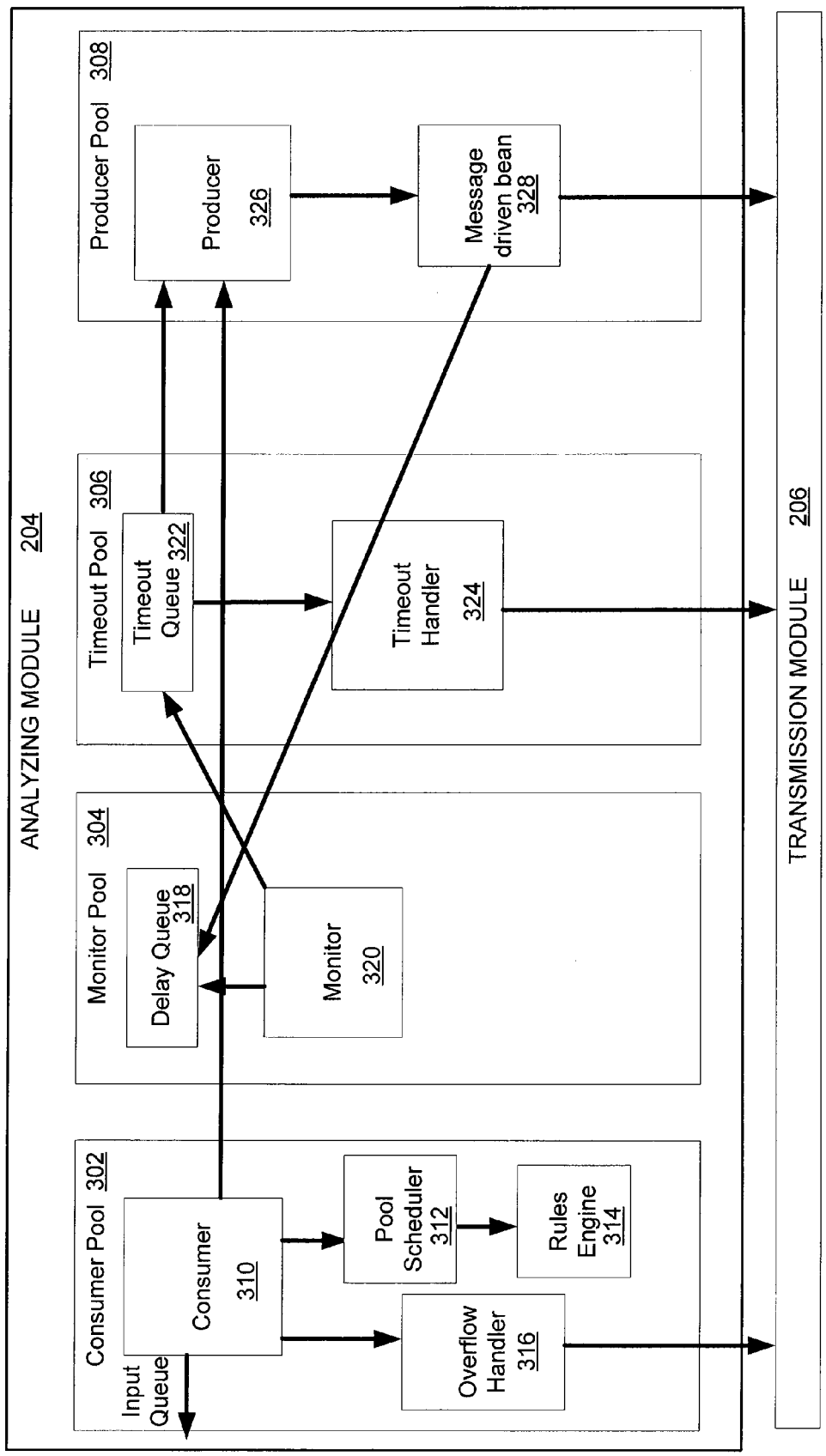
FIG. 3 is a block diagram of an exemplary module for analyzing availability of the backend system, according to an exemplary embodiment.

Referring to FIG. 3, a block diagram of analyzing module 204 is depicted, according to an embodiment. As shown in FIG. 3, in an exemplary embodiment, analyzing module 204 may include a consumer pool 302, a monitor pool 304, a timeout pool 306 and a producer pool 308.

Consumer pool 302 receives a request from an input queue (not shown) and sends the request for appropriate processing. In an embodiment, consumer pool 302 may include a consumer 310, a producer pool scheduler 312, a rules engine 314 and an overflow handler 316. Producer pool scheduler 312 determines whether a producer 326 is available for processing the received request. Rules engine 314 includes a set of rules which are executed to select an appropriate producer 326 for processing. Upon determination that producer 326 is available, the request is forwarded by consumer 310 to producer 326 for processing. In one embodiment, the request may be directly sent to the overflow handler 316 upon determination that producer 326 is not available for processing the request. Overflow handler 316 may be configured for generating an overflow response for requestor 102.

In an embodiment, monitor pool 304 may include a delay queue 318 and a monitor 320.

Monitor 320 may poll delay queue 318 and monitor the context of the request. Based on the context, the request may be removed from delay queue 318 and transferred to the timeout pool 306. In an embodiment, timeout pool 306 may include a timeout queue 322 and a timeout handler 324. In an example scenario, monitor 320 may determine that SLA is about to expire. As a result, the request may be transferred to timeout queue 322 and timeout handler 324 may send a timeout response to requestor 102.

Producer pool 308 receives the request from consumer 302 for processing. In an embodiment, producer pool 308 may include the producer 326 and a message driven bean (MDB) 328. In response to receiving the request, producer 326 may invoke the MDB 328 for processing the request. Execution of the MDB 328 may be triggered by a message from the producer 326.

Figure 4:
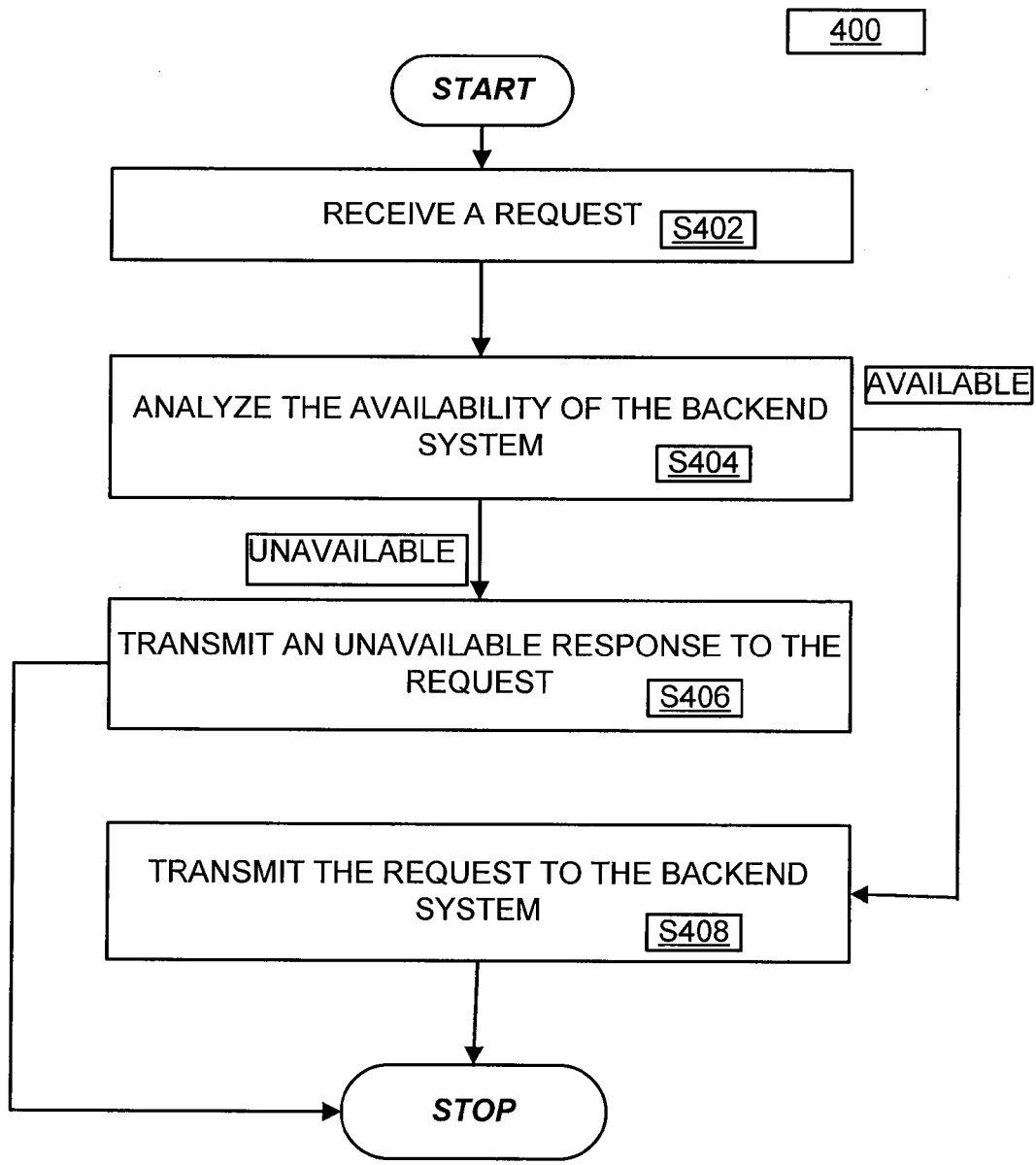
FIG. 4 is a flowchart illustrating one example process for providing response to the requestor, according to an exemplary embodiment.

FIG. 4 is a flowchart illustrating an example process 400 for providing a response to a request made by requestor 102, according to an exemplary embodiment.

In an embodiment, request handling system 104 may receive a request from requestor 102 (step S402). The request made by requestor 102 may be a Java based request.

In response to receiving the request, analyzing module 204 of request handling system 104 may analyze availability of backend system 106 (step S404). Analyzing module 204 may track response of backend system 106 and determine availability/unavailability of backend system 106. In one embodiment, analyzing module 204 may detect that backend system 106 is available. As a result, analyzing module 204 may direct transmission module 206 to transmit the request to backend system 106 for processing (step S408). In another embodiment, analyzing module 204 may detect that backend system 106 is unavailable. Thereafter, analyzing module 204 may send the result of determination to transmission module 206. Transmission module 206 may transmit the unavailable response to requestor 102 (step S406). The unavailable response may include a notice indicating there is an error, a notice indicating that the system is buffering, a notice directing the requestor 102 to try an additional communication channel (e.g., phone network), a notice directing the requestor 102 to try again at a later time, and the like. Further, in response to detecting unavailability, request may not be transmitted to the backend system 106 to improve availability of backend system 106. In another embodiment, analyzing module 204 may detect a decrease in response from the backend system 106. Upon detection, analyzing module 204 may determine that backend system 106 is unavailable to process the request.

In another embodiment, analyzing module 204 may determine that backend system 106 is available. Based on this, transmission module 206 may send the request to backend system 106 for processing (Step S408). Backend system 106 processes the request and provides a response to the requestor 102.

While the steps outlined above represent a specific embodiment, practitioners will appreciate that there are any number of computing algorithms and user interfaces that may be applied to create similar results. The steps are presented for the sake of explanation only and are not intended to limit the scope of the disclosure in any way.

Figure 5:
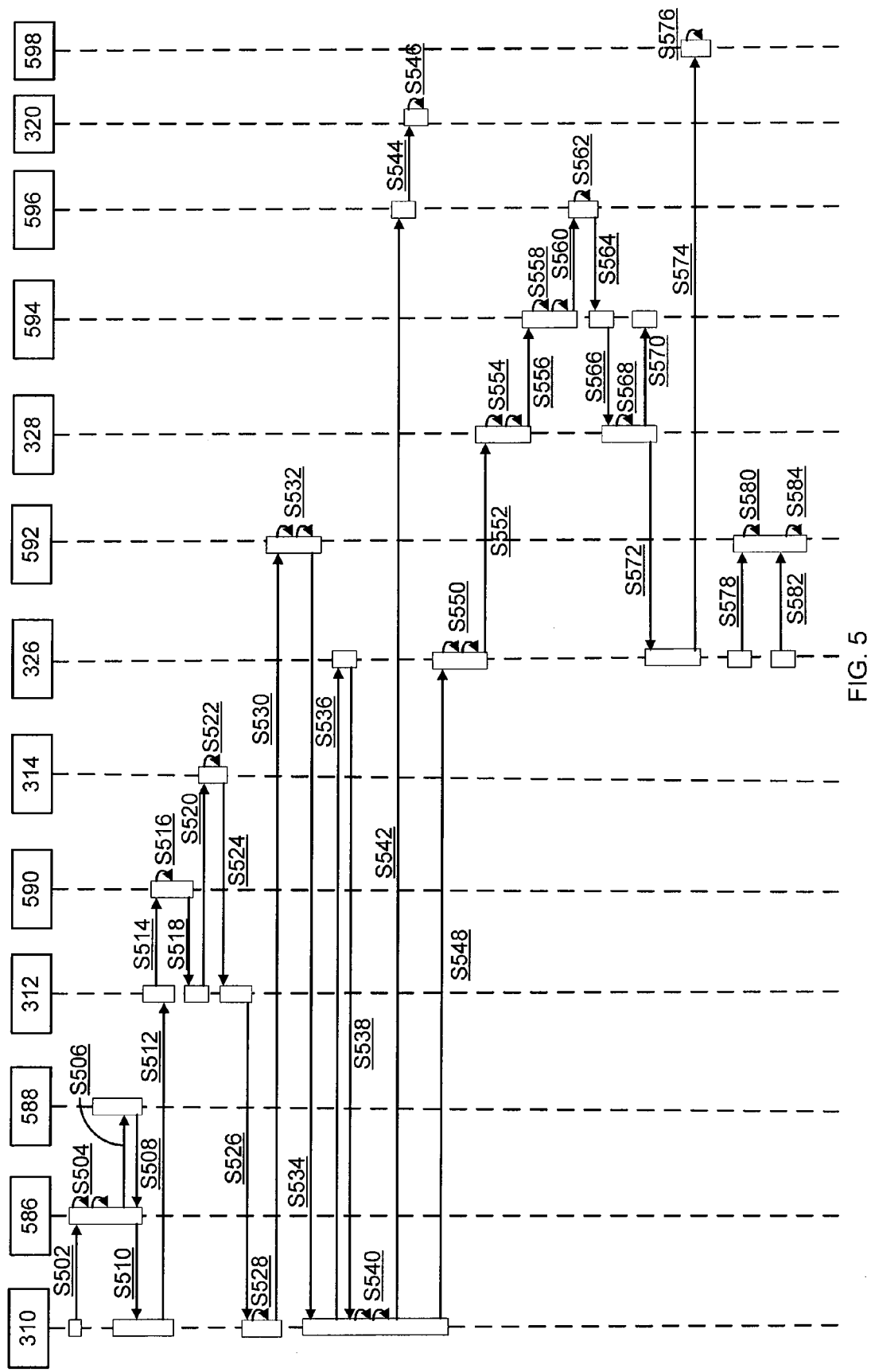
FIG. 5 is a sequence diagram illustrating one example process for processing the request, according to an exemplary embodiment.

FIG. 5 illustrates a sequence diagram for an example process for processing the request, according to an embodiment. In step S502, consumer 310 may direct a listener 586 to get the request made by requestor 102. Listener 586 may poll the input queue and obtain the request in step S504. In step S506, the request may be transferred to a message handler 588 for decoding. Message handler 588 may return the decoded request to listener 586 in step S508 which may be forwarded to consumer 310 in step S510.

In response to receiving the decoded request, consumer 310 may ask producer pool scheduler 312, at step S512, to obtain name of a producer pool available for processing the request. In step S514, producer pool scheduler 312 may send the request to a request parser 590 for parsing. Request parser 590 may parse the request and populate a data map in step S516. Request parser 590 may return the data map to producer pool scheduler 312 in step S518. Further, producer pool scheduler 312 may direct a rules engine 314 in step S520 to obtain name of a producer pool for processing the request. In step S522, rules engine 314 may execute the configured rules and determine name of the producer pool available for processing the request. The name of the producer pool may be returned to producer pool scheduler 312 in step S524 which forwards it to consumer 310 in step S526.

In step S528, consumer 310 may obtain information of producer manager corresponding to the determined producer pool. Thereafter, consumer 310 may contact a producer manager 592 in step S530 to obtain a producer available for processing the request. In step S532, producer manager 592 may check a producer stack for available producers. Upon identifying that a producer 326 is available, producer manager 592 may return information regarding producer 326 to consumer 310 in step S534. In step S536, consumer 310 may direct producer 326 to obtain request context. Producer 326 may obtain the context and return it to consumer 310 in step S538. In step S540, the request context obtained in the previous step may be populated by consumer 310 with other details of the request. Also, consumer 310 may check whether monitoring is selected/requested for this request in this step. In one embodiment, if monitoring is enabled, the request context may be sent to a monitor manager 596 in step S542. In step S544, monitor manager 596 may ask monitor 320 to start monitoring the request context. As requested, monitor 320 may monitor the request context in step S546. In an embodiment, monitor 320 may determine that SLA is about to expire. In such cases, monitor 320 may push the request to timeout handler 324 for providing a timeout response to requestor 102.

In another embodiment, if monitoring is not requested/selected, consumer 310 may notify producer 326 in step S548 about the request context for processing the request. In step S550, producer 326 may obtain information regarding MDB 328 from request context. The request may be sent to MDB 328 for processing in step S552. In step S554, MDB 328 may transform and encode the request using the transformation logic. Further, MDB 328 may send the request to a transport module 594 in step S556. In step S558, transport module 594 may obtain a response (corresponding to the request) and reference of monitor manager 596. Transport module 594 may ask monitor manager 596 to remove request context in step S560. As a result, monitor manager 596 may remove request context from delay queue 318 in step S562 and may inform the transport module 594 regarding the same in step S564.

Transport module 594 may send the response to MDB 328 in step S566. In step S568, MDB 328 may encode the response and also send it to requestor 102. Then, the encoded response may be sent by MDB 328 to transport module 594 in step S570. Also, producer 326 may be informed by MDB 328 regarding the sending of response in step S572. In step S574, producer 326 may direct a statistics handler 598 to update statistical information from the request context. Statistics handler 598 may update statistical information from the request context in step S576. In an embodiment, statistics handler 598 may write the statistical information into log files. In step S578, producer 326 may direct MDB 328 to return to producer pool 308. As a result, MDB 328 is recycled back into producer pool 308 in step S580. Similarly, producer 326 is recycled back into producer pool 308 in steps S582 and S584.

Figure 6:
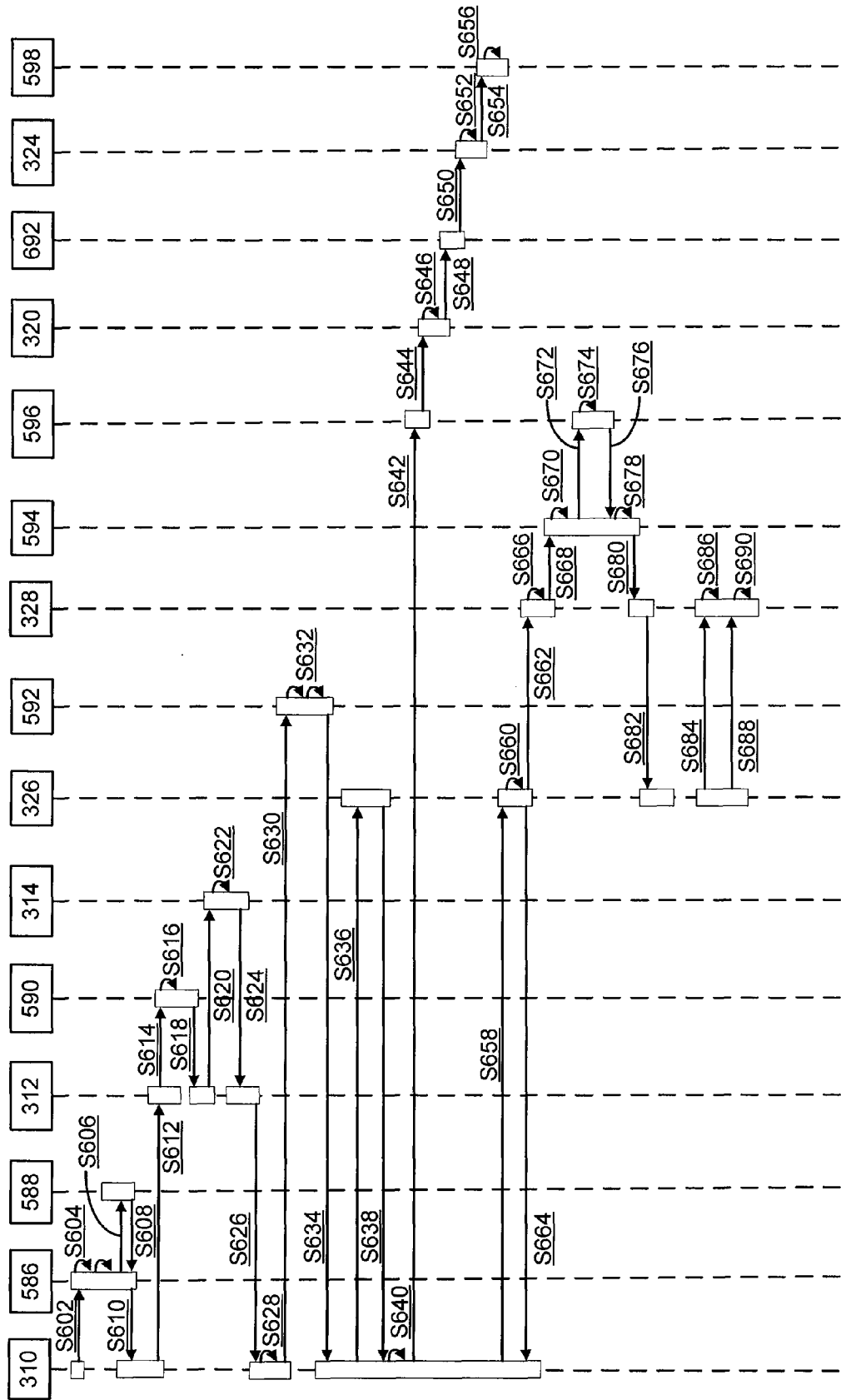
FIG. 6 is a sequence diagram illustrating one example process for processing the request in a timeout scenario, according to an exemplary embodiment.

FIG. 6 illustrates a sequence diagram for another example process for processing the request, according to an embodiment. In step S602, consumer 310 may direct a listener 586 to get the request made by requestor 102. Listener 586 may poll the input queue and obtain the request in step S604. In step 506, the request may be transferred to a message handler 588 for decoding. Message handler 588 may return the decoded request to listener 586 in step S608 which may be forwarded to consumer 310 in step S610.

In response to receiving the decoded request, consumer 310 may ask producer pool scheduler 312 in step S612 to obtain name of a producer pool available for processing the request. In step S614, producer pool scheduler 312 may send the request to a request parser 590 for parsing. Request parser 590 may parse the request and populate a data map in step S616. Request parser 590 may return the data map to producer pool scheduler 312 in step S618. Further, producer pool scheduler 312 may direct a rules engine 314 in step S620 to obtain name of a producer pool for processing the request. In step S622, rules engine 314 may execute the configured rules and determine name of the producer pool available for processing the request. The name of the producer pool may be returned to producer pool scheduler 312, in step S624, which forwards it to consumer 310 in step S626.

In step S628, consumer 310 may obtain information of a producer manager corresponding to the determined producer pool. Thereafter, consumer 310 may contact a producer manager 592 in step S630 to obtain a producer available for processing the request. In step S632, producer manager 592 may check a producer stack for available producers. Upon identifying that producer 326 is available, producer manager 592 may return information regarding producer 326 to consumer 310 in step S634. In step S636, consumer 310 may direct producer 326 to obtain request context. Producer 326 may obtain the context and return it to consumer 310 in step S638. In step S640, the request context obtained in the previous step may be populated by consumer 310 with other details of the request. Also, consumer 310 may check whether monitoring is enabled for this request in this step. In one embodiment, if monitoring is enabled, the request context may be sent to a monitor manager 596 in step S642. In step S644, monitor manager 596 may ask monitor 320 to start monitoring the request context. As requested, monitor 320 may monitor the request context in step S646. In an embodiment, monitor 320 may determine that SLA is about to expire. In such cases, monitor 320 may remove the request from delay queue 318 and add it to timeout queue 322 in step S648. A timeout manager 692 may be informed about addition of the request to timeout queue 322 in the previous step. In step S650, timeout manager 692 may notify timeout handler 324 about the addition of request. Timeout handler 324 may send the timeout response to the requestor 102 in step S652. Further, timeout handler 324 may ask statistics handler 598 to update information regarding timeout response in step S654. In step S656, statistics handler 598 may update statistical information regarding timeout response.

In another embodiment, if monitoring is not enabled, consumer 310 may notify producer 326 in step S658 about the request context for processing the request. In step S660, producer 326 may obtain information regarding MDB 328 from request context. The request may be sent to MDB 328 for processing in step S662. Also, consumer 310 may be informed regarding the status of producer 326 in step S664. In step S666, MDB 328 may transform and encode the request using the transformation logic. Further, MDB 328 may send the request to a transport module 594 in step S668. In step S670, transport module 594 may obtain a response (corresponding to the request) and reference of monitor manager 596. Transport module 594 may ask monitor manager 596 to remove request context in step S672. In step S674, monitor manager 596 may find that request context is already removed from delay queue 318 and may inform the transport module 594 regarding the same in step S676. In step S678 transport module 594 may ignore the response obtained in step S670.

Transport module 594 may send a return response to MDB 328 in step S680. In step S682, MDB 328 may further send the return response to producer 326. In step S684, producer 326 may direct MDB 328 to return to producer pool 308. As a result, MDB 328 is recycled back into producer pool 308 in step S686. Similarly, producer 326 is recycled back into producer pool 308 in steps S688 and S690.

Figure 7:
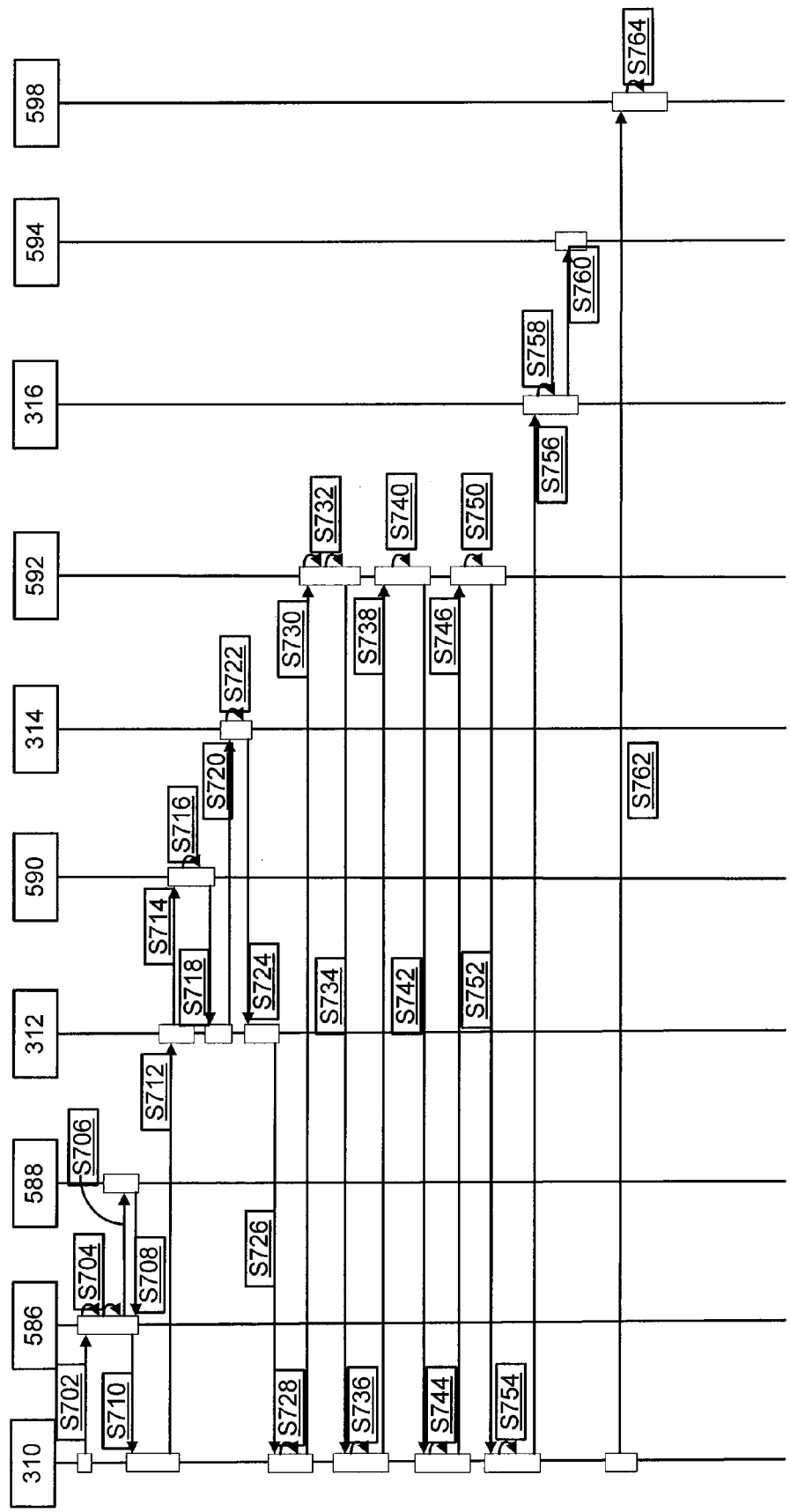
FIG. 7 is a sequence diagram illustrating one example process for processing the request in an overflow scenario, according to an exemplary embodiment.

FIG. 7 illustrates a sequence diagram for yet another example process for processing the request, according to an embodiment. In step S702, consumer 310 may direct a listener 586 to get the request made by requestor 102. Listener 586 may poll the input queue and obtain the request in step S704. In step S704, the request may be transferred to a message handler 588 for decoding. Message handler 588 may return the decoded request to listener 586, in step S708, which may be forwarded to consumer 310 in step S710.

In response to receiving the decoded request, consumer 310 may ask producer pool scheduler 312, at step S712, to obtain name of a producer pool available for processing the request. In step S714, producer pool scheduler 312 may send the request to a request parser 590 for parsing. Request parser 590 may parse the request and populate a data map in step S716. Request parser 590 may return the data map to producer pool scheduler 312 in step S718. Further, producer pool scheduler 312 may direct a rules engine 314 in step S720 to obtain name of a producer pool for processing the request. In step S722, rules engine 314 may execute the configured rules and determine name of the producer pool available for processing the request. The name of the producer pool may be returned to producer pool scheduler 312 in step S724 which forwards it to consumer 310 in step S726.

In step S728, consumer 310 may obtain information of a producer manager corresponding to the determined producer pool. Thereafter, consumer 310 may contact a producer manager 592 in step S730 to obtain the producer 326 available for processing the request. In step S732, producer manager 592 may check a producer stack for available producers. Upon identifying that producer 326 is not available; producer manager 592 may return a null response to consumer 310 in step S734. In step S736, consumer 310 may wait for a predetermined overflow wait time. After expiry of the overflow wait time, consumer 310 may again contact producer manager 592 in step S738 to check whether producer 326 has become available. In step S740, producer manager 592 may again check the producer stack for available producers. Upon identifying that producer 326 is still not available, producer manager 592 may again return null to consumer 310 in step S742. The above sequence of steps may be repeated in steps (S744 to S752) until the number of retry attempts reaches a predetermined count in step S754. As a result, consumer 310 may send information regarding overflow to overflow handler 316 in step S756. In step 758, overflow handler 316 may construct an overflow response. Then, overflow handler 316 may send the overflow response to transport module 594 in step S760 which may forward it to requestor 102. Further, consumer 310 may ask statistics handler 598 to update information regarding overflow response in step S762. In step S764, statistics handler 598 may update statistical information regarding overflow response.

The present disclosure (i.e., request handling system 104, process 300, any part(s) or function(s) thereof) may be implemented using hardware, software or a combination thereof, and may be implemented in one or more computer systems or other processing systems. However, the manipulations performed were often referred to in terms, such as comparing or checking, which are commonly associated with mental operations performed by a human operator. No such capability of a human operator is necessary, or desirable in most cases, in any of the operations described herein, which form a part of the present disclosure. Rather, the operations are machine operations. Useful machines for performing the operations in the present disclosure may include general-purpose digital computers or similar devices.

In fact, in accordance with an embodiment, the present disclosure is directed towards one or more computer systems capable of carrying out the functionality described herein.

The computer system 800 includes at least one processor, such as a processor 802. Processor 802 is connected to a communication infrastructure 804, for example, a communications bus, a cross over bar, a network, and the like. Various software embodiments are described in terms of this exemplary computer system 800. After reading this description, it will become apparent to a person skilled in the relevant art(s) how to implement the present disclosure using other computer systems and/or architectures.

Figure 8:
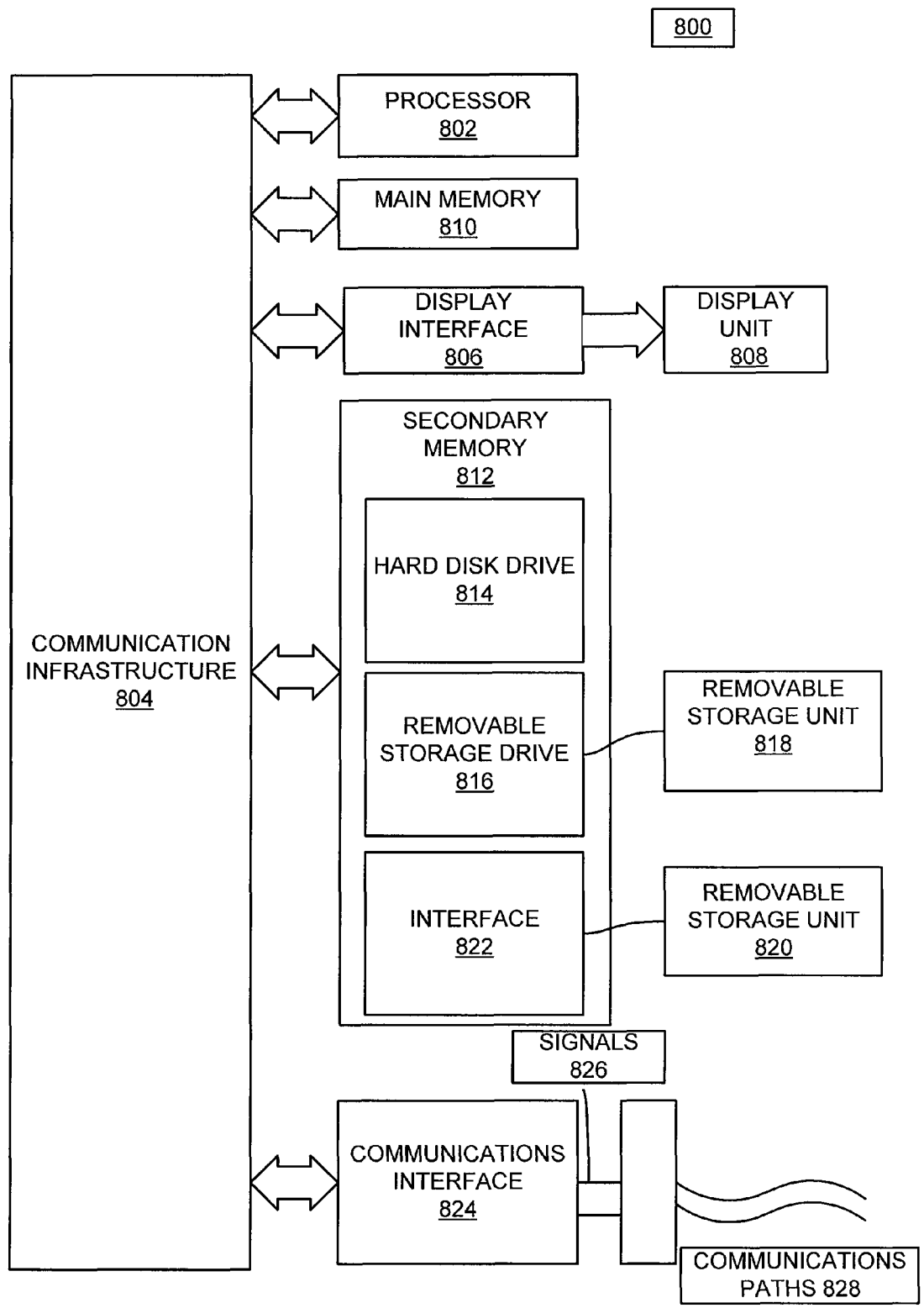
FIG. 8 is a block diagram of an exemplary computer system, according to an exemplary embodiment.

The computer system 800 includes a display interface 806 that forwards graphics, text, and other data from the communication infrastructure 804 (or from a frame buffer which is not shown in FIG. 8) for display on a display unit 808.

The computer system 800 further includes a main memory 810, such as random access memory (RAM), and may also include a secondary memory 812. The secondary memory 812 may further include, for example, a hard disk drive 814 and/or a removable storage drive 816, representing a floppy disk drive, a magnetic tape drive, an optical disk drive, etc. The removable storage drive 816 reads from and/or writes to a removable storage unit 818 in a well known manner. The removable storage unit 818 may represent a floppy disk, magnetic tape or an optical disk, and may be read by and written to by the removable storage drive 816. As will be appreciated, the removable storage unit 818 includes a computer usable storage medium having stored therein, computer software and/or data.

In accordance with various embodiments, the secondary memory 812 may include other similar devices for allowing computer programs or other instructions to be loaded into the computer system 800. Such devices may include, for example, a removable storage unit 820, and an interface 822.

Examples of such may include a program cartridge and cartridge interface (such as that found in video game devices), a removable memory chip (such as an erasable programmable read only memory (EPROM), or programmable read only memory (PROM)) and associated socket, and other removable storage units 820 and interfaces 822, which allow software and data to be transferred from the removable storage unit 820 to the computer system 800.

The computer system 800 may further include a communication interface 824. The communication interface 824 allows software and data to be transferred between the computer system 800 and external devices. Examples of the communication interface 824 include a modem, a network interface (such as an Ethernet card), a communications port, and/or a Personal Computer Memory Card International Association (PCMCIA) slot and/or card. Software and data transferred via the communication interface 824 may be in the form of a plurality of signals, hereinafter referred to as signals 826, which may be electronic, electromagnetic, optical or other signals capable of being received by the communication interface 824. The signals 826 are provided to the communication interface 824 via a communication path (e.g., channel) 828. The communication path 828 may carry the signals 826 and may be implemented using wire or cable, fiber optics, a telephone line, a cellular link, a radio frequency (RF) link and/or other communication channels.

In this document, the terms "computer program medium" and "computer usable medium" are used to generally refer to media such as the removable storage drive 816, a hard disk installed in hard disk drive 814, the signals 826, and the like. These tangible, non-transitory computer program products provide software to the computer system 800. The present disclosure is directed to such computer program products.

Computer programs (also referred to as computer control logic) are stored in the main memory 810 and/or the secondary memory 812. Computer programs may also be received via the communication interface 804. Such computer programs, when executed, enable the computer system 800 to perform the features of the present disclosure, as discussed herein. In particular, the computer programs, when executed, enable the processor 802 to perform the features of the present disclosure. Accordingly, such computer programs represent controllers of the computer system 800.

In accordance with an embodiment, where the disclosure is implemented using software, the software may be stored in a computer program product and loaded into the computer system 800 using the removable storage drive 816, the hard disk drive 814 or the communication interface 824. The control logic (software), when executed by the processor 802, causes the processor 802 to perform the functions of the present disclosure as described herein.

In another embodiment, the present disclosure is implemented primarily in hardware using, for example, hardware components such as application specific integrated circuits (ASIC). Implementation of the hardware state machine so as to perform the functions described herein will be apparent to persons skilled in the relevant art(s).

In yet another embodiment, the present disclosure is implemented using a combination of both the hardware and the software.

As those skilled in the art will appreciate, a web client includes an operating system (e.g., Windows NT®, 95/98/2000/CE/Mobile, OS2, UNIX®, Linux®, Solaris®, MacOS®, PalmOs, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In an exemplary embodiment, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In an embodiment, various components, modules, and/or engines of system 100 may be implemented as micro-applications or micro-apps. Micro-apps are typically deployed in the context of a mobile operating system, including for example, a Palm mobile operating system, a Windows mobile operating system, an Android®, Operating System, Apple®, iOS, a Blackberry®, operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in *In Re Nuijten* to fall outside the scope of patentable subject matter under 35 U.S.C. §101.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the present systems and/or methods. It should be understood that the detailed description and specific examples, indicating exemplary embodiments of the disclosure, are given for purposes of illustration only and not as limitations. Many changes and modifications within the scope of the instant disclosure may be made without departing from the spirit thereof, and the systems and/or methods include all such modifications. Corresponding structures, materials, acts, and equivalents of all elements in the claims below are intended to include any structure, material, or acts for performing the functions in combination with other claim elements as specifically claimed. The scope of the disclosure should be determined by the appended claims and their legal equivalents, rather than by the examples given above. Reference to an element in the singular is not intended to mean "one and only one" unless explicitly so stated, but rather "one or more." Moreover, where a phrase similar to 'at least one of A, B, and C is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

While various embodiments of the present disclosure have been described above, it should be understood that they have been presented by way of example, and not limitation. It will be apparent to persons skilled in the relevant art(s) that various changes in form and detail can be made therein without departing from the spirit and scope of the present disclosure. Thus, the present disclosure should not be limited by any of the above described exemplary embodiments, but should be defined only in accordance with the following claims and their equivalents.

In addition, it should be understood that the figures illustrated in the attachments, which highlight the functionality and advantages of the present disclosure, are presented for example purposes only. The architecture of the present disclosure is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

The invention claimed is:

1. A method comprising:
  receiving, by a computer system, a request to transact with a backend system to perform one or more specified computing tasks;
  analyzing, by the computer system, availability of computing resources of the backend system to process the request, wherein the computing resources include one or more resource pools;
  responsive to the analyzing, the computer system determining that the backend system is currently unavailable to process the request but is anticipated to become available to process the request within a predetermined length of time;
  based on the determining that the backend system is currently unavailable to process the request but is anticipated to become available to process the request within the predetermined length of time, the computer system storing the request in a process request wait queue;
  monitoring, by the computer system, the request in the process request wait queue;
  responsive to the monitoring, the computer system determining whether to transfer the request from the process request wait queue to a timeout queue based on the request having been stored in the process request wait queue for the predetermined length of time, wherein the timeout queue processes termination of the request upon receipt of the request from the process request wait queue;
  in response to determining that the backend system has become available to process the request and to the monitoring indicating that the predetermined length of time has not been reached for the request, the computer system removing the request from the process request wait queue and transmitting the request to the backend system for processing;
  tracking, by the computer system, at least one of a volume of responses transmitted by the computer system indicating that the backend system is unavailable, a reason for backend system unavailability associated with one or more of a plurality of responses indicating that the backend system is unavailable, a time to return a response indicating that the backend system is unavailable, or a measure of resources available in the one or more resource pools; and causing, by the computer system, at least one of the one or more resource pools to be resized based on a result of the tracking.

2. The method of claim 1, wherein the backend system is a java dispatcher backend system.

3. The method of claim 1, wherein the request is a java based request.

4. The method of claim 1, further comprising transmitting, by the computer system, a notice indicating that that the request has been queued due to the backend system being temporarily unavailable.

5. The method of claim 1, wherein the determining is based on at least one of: detecting a decrease in backend system responses to requests that are sent to the backend system, receiving information related to a status and an amount of resources for each of a plurality of resource pools at the backend system, or receiving information related to historical availability data for the backend system, wherein the historical availability data corresponds to results of requests made by a particular requestor in the past.

6. A non-transitory computer-readable medium having stored thereon instructions executable by a computer system to cause the computer system to perform operations comprising:
  receiving a request from a client, wherein the request is for a software service running on a backend system;
  analyzing availability of the backend system to process the request based on at least one of: historical availability data associated with previous requests destined for the backend system, information related to a status and an amount of resources for each of a plurality of resource pools at the backend system, or detecting a decrease in backend system responses to requests that are sent to the backend system;
  based on the analyzing, determining the backend system is unavailable to process the request but is anticipated to become available to process the request within a predetermined length of time;
  responsive to determining the backend system is unavailable to process the request but is anticipated to become available to process the request within a predetermined length of time, storing the request in a process request wait queue;
  monitoring the request in the process request wait queue;
  responsive to the monitoring, determining whether to transfer the request from the process request wait queue to a timeout queue based on the request having been stored in the process request wait queue for the predetermined length of time, wherein the timeout queue processes termination of the request upon receipt of the request from the process request wait queue;
  in response to information indicating the backend system has become available to process the request and to the monitoring indicating that the predetermined length of time has not been reached for the request, removing the request from the process request wait queue and transmitting the request to the backend system for processing
  tracking at least one of a volume of responses transmitted by the computer system indicating that the backend system is unavailable, a reason for backend system unavailability associated with one or more of a plurality of responses indicating that the backend system is unavailable, a time to return a response indicating that the backend system is unavailable, or a measure of resources available in the plurality of resource pools; and
  causing at least one of the plurality of resource pools to be resized based on a result of the tracking.

7. The non-transitory computer-readable medium of claim 6, wherein the request is received via a web application.

8. A system comprising:
  one or more processors; and
  a memory coupled to the one or more processors, wherein the memory has stored thereon instructions executable to cause the system to perform operations comprising:
    receiving, from a client, a request to transact with a backend system to perform one or more specified computing tasks;
    analyzing availability of computing resources of the backend system to process the request, wherein the computing resources include one or more resource pools;
    determining the backend system is currently unavailable to process the request but is anticipated to become available to process the request within a predetermined length of time;
    based on the determining that the backend system is currently unavailable to process the request but is anticipated to become available to process the request within the predetermined length of time, storing the request in a process request wait queue;
    monitoring the request in the process request wait queue;
    responsive to the monitoring, determining whether to transfer the request from the process request wait queue to a timeout queue based on the request having been stored in the process request wait queue for the predetermined length of time, wherein the timeout queue processes termination of the request upon receipt of the request from the process request wait queue;
    in response to determining that the backend system has become available to process the request and to the monitoring indicating that the predetermined length of time has not been reached for the request, removing the request from the process request wait queue and transmitting the request to the backend system for processing
    tracking at least one of a volume of responses transmitted by the system indicating that the backend system is unavailable, a reason for backend system unavailability associated with one or more of a plurality of responses indicating that the backend system is unavailable, a time to return a response indicating that the backend system is unavailable, or a measure of resources available in the one or more resource pools; and
    causing at least one of the one or more resource pools to be resized based on a result of the tracking.

9. The system of claim 8, wherein the predetermined length of time is defined in a service level agreement.

10. The system of claim 8, wherein the operations further comprise transmitting a response to the client indicating that the request has been accepted.

11. The system of claim 8, wherein the determining is based on at least one of: detecting a decrease in backend system responses to requests that are sent to the backend system, receiving information related to a status and an amount of resources for each of a plurality of resource pools at the backend system, or receiving information related to historical availability data for the backend system, wherein the historical availability data comprises an average response time for a plurality of previous requests.

\* \* \* \* \*